Figure 1:
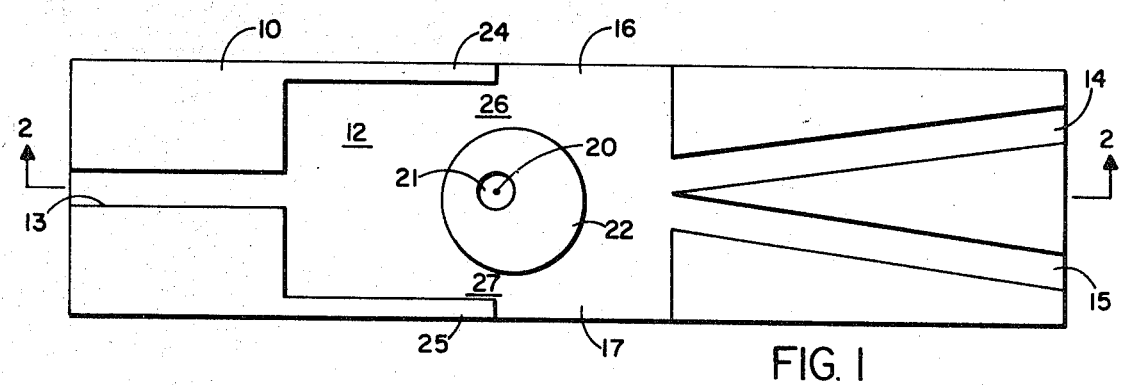

United States Patent

[11] 3,554,208

| [72] | Inventor | Apostolos P. Kizilos<br>Minnetonka, Minn. |
|---|---|---|
| [21] | Appl. No. | 817,096 |
| [22] | Filed | Apr. 17, 1969 |
| [45] | Patented | Jan. 12, 1971 |
| [73] | Assignee | Honeywell Inc.<br>Minneapolis, Minn.<br>a corporation of Delaware |

[54] SUPERVISORY APPARATUS
14 Claims, 2 Drawing Figs.

| [52] | U.S. Cl. | 137/81.5 |
|---|---|---|
| [51] | Int. Cl. | F15c 3/00 |
| [50] | Field of Search | 137/81.5 |

[56] References Cited
UNITED STATES PATENTS

| 3,102,389 | 9/1963 | Pedersen et al. | 137/81.5UX |
| 3,171,915 | 3/1965 | Johnson | 137/81.5X |
| 3,209,775 | 10/1965 | Dexter et al. | 137/81.5 |
| 3,276,463 | 10/1966 | Bowles | 137/81.5 |
| 3,311,987 | 4/1967 | Blazek | 137/81.5X |
| 3,371,540 | 3/1968 | Colombani et al. | 137/81.5X |
| 3,435,837 | 4/1969 | Sher | 137/81.5 |
| 3,451,408 | 6/1969 | Evans | 137/81.5 |
| 3,452,768 | 7/1969 | Sieracki | 137/81.5X |
| 3,476,131 | 11/1969 | Davison et al. | 137/81.5 |
| 3,495,253 | 2/1970 | Richards | 137/81.5 |

*Primary Examiner*—Samuel Scott
*Attorneys*—Charles J. Ungemach and George W. Field ABSTRACT: Apparatus for giving a fluidic signal in accordance with the angular position of a rotatable shaft.

PATENTED JAN 12 1971  3,554,208

INVENTOR.
APOSTOLOS P. KIZILOS
BY
ATTORNEY

SUPERVISORY APPARATUS

THE INVENTION

This invention relates to the field of supervisory apparatus, and more particularly to apparatus for giving a fluidic signal determined by the angular displacement of a rotatable input shaft from a predetermined standard position. The apparatus is a close fluidic analogue to the well known synchro in electrical equipment.

In the rapidly expanding field of fluidics, sensors are already known for giving signals in accordance with variations in such parameters as temperature, pressure, velocity, acceleration, and linear displacement, but there has heretofore been no apparatus for giving a fluidic signal in accordance with angular displacement directly, that is, without transducing from some other signal medium to the fluid medium. Many supervisory, indicating, and control systems require an angular displacement signal. Accordingly it is a principal object of this invention to provide a new supervisory device to meet these needs—that is, to provide a fluidic synchro.

Various other objects, advantages, and features of novelty not individually enumerated above which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which I have illustrated and described a preferred embodiment of my invention.

Figure 2:
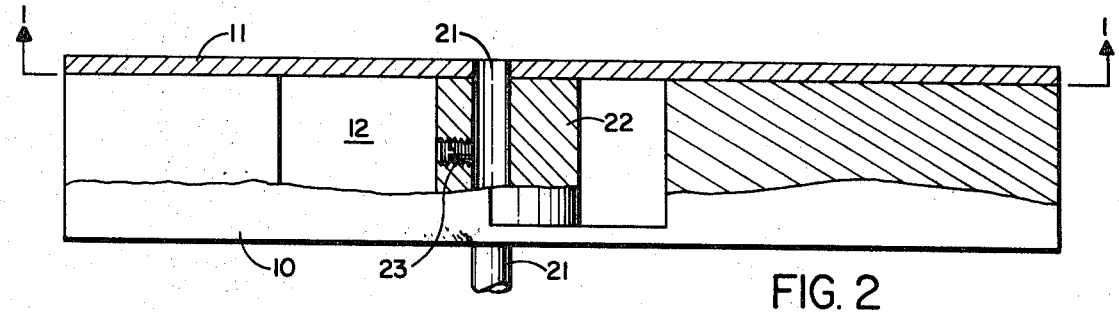

In the drawing, FIG. 1 is a sectional plan view of one embodiment of my invention with a cover plate removed and FIG. 2 is an elevation of the device, shown partly in the section along the line 2–2 of FIG. 1.

The device is shown to comprise a body 10 and a cover plate 11. Body 10 is bilaterally symmetrical about a central longitudinal plane normal to the paper and includes a central channel 12, a fluid inlet 13, a pair of fluid outlets 14 and 15 arranged like the receiver of a conventional fluid amplifier, and a pair of further apertures or vents 16 and 17. Body 10 and plate 11 are cross-bored along an axis 20 lying in the plane of symmetry to receive a shaft 21, and a cylindrical plate or member 22 is integral with shaft 21 or eccentrically secured thereto by suitable means suggested by a set screw 23.

The surface of member 22 coacts with lateral walls 24 and 25 of channel 12 to define a pair of nozzles 26 and 27 which vary in width, in opposite senses, as member 22 is rotated by rotation of shaft 21.

While the drawing shows that the axis of shaft 20 and the edges of walls 24 and 25 lie in one plane, other configurations are also possible.

When fluid is admitted to channel 12 through inlet 13 it emerges through nozzles 26 and 27 as a pair of jets which attach to the cylindrical surface of member 22 and flow therearound until they impinge on one another. The resulting common stream detaches from the member in a radial direction: for the special case where the nozzles are of equal width the common stream is directed along the plane of symmetry of the device, and flows equally in outlets 14 and 15. This defines the zero position of the member.

If member 22 is positioned so that nozzle 26 is wider than nozzle 27, the momentum of the stream from the former is greater than that from the latter, the combined stream detaches from member 22 at a point clockwise from that of the zero position, and the flow in outlet 15 is greater than that in outlet 14: the greater the difference between the widths of the nozzles, the greater the differential flow in the outlets. If the sense of the width difference reverses, the sense of the flow differential also reverses.

By suitably selecting parameters it is possible to make the jet deflection proportional to the rotation of shaft 21 over a considerable range of angles. Also, if the difference between the diameter of member 22 and the width of channel 12 is much greater that the eccentricity of member 22, the jet deflections may be made a function of the sine of the angle of rotation of shaft 21 over a considerable range of angles.

My apparatus is not limited to use as an angular position sensor. It will be readily apparent that if shaft 21 is continuously rotated, the result is a jet of fluid from member 22 which oscillates back and forth across the plane of symmetry. The structure thus becomes a pulse generator where the repetition frequency is determined by the shaft speed. It is even possible to omit the receiver portion of base 10, including outlets 14 and 15, and use the oscillating jet directly, in a spray gun, for example, or a computer card separator. For all of these applications body 10 and plate 11 will, of course, be provided with suitable antifriction bearings for shaft 21.

I claim:

1. Apparatus of the class described comprising, in combination:
 a channel;
 means for supplying fluid to said channel;
 a member configured for insertion in the end of said channel to close at least a major central portion thereof and thereby produce a pair of aligned spaced outlet nozzles each defined in breadth by a wall of said channel and contiguous portion of a surface of said member;
 means rotatably mounting said member in said end of said channel for rotation about an axis extending transversely in said channel so that a significant portion of said member may project beyond said end of said channel, said surface being so configured with respect to said axis that the breadths of said nozzles do not change simultaneously in the same sense and at the same rate as said member rotates; and
 means for causing rotation of said member about said axis to vary the breadths of said nozzles and therefore the momenta of the streams issuing from said nozzles.

2. Apparatus according to claim 1 in which the end of said channel embodies a pair of spaced plane walls normal to said axis and said member comprises a plate of uniform thickness equal to the space between said planes.

3. Apparatus according to claim 1 in which said surface has a curvature which is everywhere of the same polarity.

4. Apparatus according to claim 1 in which said surface is a convex cylinder.

5. Apparatus according to claim 4 in which said axis passes through a point of other than the centroid of any section of said member normal to said axis.

6. Apparatus according to claim 5 in which the cross section of said member normal to said axis is a conic section.

7. Apparatus according to claim 5 in which the cross section of said member normal to said axis is a circle and said axis passes through said circle at a point other than the center thereof.

8. Apparatus according to claim 1 in which said surface is continuous on the downstream side of said member, so that jets from said nozzle attach to and wrap around said surface to impinge and thereupon detach from said surface as a single jet, the direction of said single jet being determined by the rotated position of said member.

9. Apparatus according to claim 8 together with means responsive to the direction of said single jet.

10. Apparatus according to claim 8 together with means giving a fluidic signal determined by the direction of said jet.

11. Apparatus according to claim 10 in which the last named means is a fluid amplifier receiver so positioned that when said single jet has a predetermined direction the jet passes equally into the legs of said receiver.

12. Apparatus according to claim 1 together with means causing continuous rotation of said member.

13. Apparatus according to claim 1 together with means for causing operation of the last named means in accordance with change in a variable quantity.

14. Apparatus according to claim 13 together with means connecting the last named means to a member whose angular position varies with respect to a normal position.